United States Patent
Dinauer et al.

(10) Patent No.: US 9,688,474 B2
(45) Date of Patent: Jun. 27, 2017

(54) METAL BELT FOR LASER MATERIALS PROCESSING

(71) Applicant: Lasx Industries, Inc., St. Paul, MN (US)

(72) Inventors: William Dinauer, St. Paul, MN (US); Kevin Klingbeil, St. Paul, MN (US); Josh Jeske, St. Paul, MN (US)

(73) Assignee: Lasx Industries, Inc., St Paul, MN (US)

( * ) Notice: Subject to any disclaimer, the term of this patent is extended or adjusted under 35 U.S.C. 154(b) by 187 days.

(21) Appl. No.: 14/603,601

(22) Filed: Jan. 23, 2015

(65) Prior Publication Data

US 2015/0231822 A1  Aug. 20, 2015

Related U.S. Application Data

(60) Provisional application No. 61/930,998, filed on Jan. 24, 2014.

(51) Int. Cl.
*B65G 15/42* (2006.01)
*B65G 15/58* (2006.01)

(52) U.S. Cl.
CPC ............. *B65G 15/58* (2013.01); *B65G 15/42* (2013.01)

(58) Field of Classification Search
CPC . B65G 21/2036; B65G 21/2045; B65G 15/58
USPC ..................................................... 198/689.1
See application file for complete search history.

(56) References Cited

U.S. PATENT DOCUMENTS

| | | | | | |
|---|---|---|---|---|---|
| 2,454,370 | A | * | 11/1948 | Gaspe | A21B 2/00 219/388 |
| 3,592,334 | A | * | 7/1971 | Fleischauer | B65G 21/2036 198/629 |
| 3,708,058 | A | * | 1/1973 | Kalven | B65G 21/2036 198/689.1 |
| 3,826,892 | A | * | 7/1974 | Draugelis | G03G 15/2007 219/216 |
| 3,980,863 | A | * | 9/1976 | Wulz | G03G 15/2007 219/216 |
| 5,740,852 | A | * | 4/1998 | Feuerstacke | B22D 11/0654 164/429 |
| 5,960,933 | A | * | 10/1999 | Albrecht | B65G 15/58 198/689.1 |
| 2002/0144991 | A1 | * | 10/2002 | Fromson | B41C 1/1083 219/388 |

(Continued)

*Primary Examiner* — James R Bidwell
(74) *Attorney, Agent, or Firm* — Law Office of Scott C Harris, Inc

(57) ABSTRACT

A transporting system, for laser processing a workpiece. The system uses a metal belt, formed of a metal material. The belt is formed into a continuously moving conveyor that has plural holes therein that are between 0.005" in diameter and 0.025 inches in diameter, and are spaced ≤10 mm but ≥5 mm from one another. The holes are beveled in cross-section at an angle between 40 degrees and 60 degrees to form a smaller hole size at the outer surface and a larger hole size at the inner surface. A vacuum source is connected to apply vacuum to the inner surface of the belt, to each of the larger size sections of the plural holes. A vacuum source is connected to apply vacuum to the inner surface of the belt, to each of the plural holes. A laser system, directs its output beam towards a laser processing area in an area of the belt on the outer surface to process the workpiece.

17 Claims, 3 Drawing Sheets

(56) References Cited

U.S. PATENT DOCUMENTS

2016/0032526 A1\* 2/2016 Scheffler ................ B65H 5/224
                                                                                                     162/286

\* cited by examiner

METAL BELT FOR LASER MATERIALS PROCESSING

This application claims priority from provisional application No. 61/930,998, filed Jan. 24, 2014, the entire contents of which are herewith incorporated by reference.

BACKGROUND

Laser materials processing uses a laser to cut, score, scribe, mark, weld, and perforate materials such as paper, plastics, and other target materials.

Metal belts with vacuum holes have been used in industrial applications to hold and transport target materials to be processed or converted by mechanical methods. Metal belts have not been commonly used in laser processing, however. One reason that metal belts are not commonly used is because the laser and the byproducts of laser processing can damage these metal belts and target materials during laser processing.

SUMMARY

The present invention describes an optimized solution for supporting, controlling, and transporting a workpiece or target materials during laser materials processing.

Embodiments can aid in the technical field of industrial laser materials processing by performing the following functionalities;

Holding target material at a constant focal plane during laser processing;

Accurately transporting the target material throughout laser processing;

Reducing smoke and debris collection on target material;

Reducing back reflection of the focused laser beam by the metal belt;

Reduction of abrupt reaction and a burning process caused from laser intersection with vacuum holes in the metal belt;

Being capable of withstanding high power outputs and energy densities from the laser source.

Being capable of accurately controlling small parts formed in the target material from laser processing.

DETAILED DESCRIPTION

Figure 1:
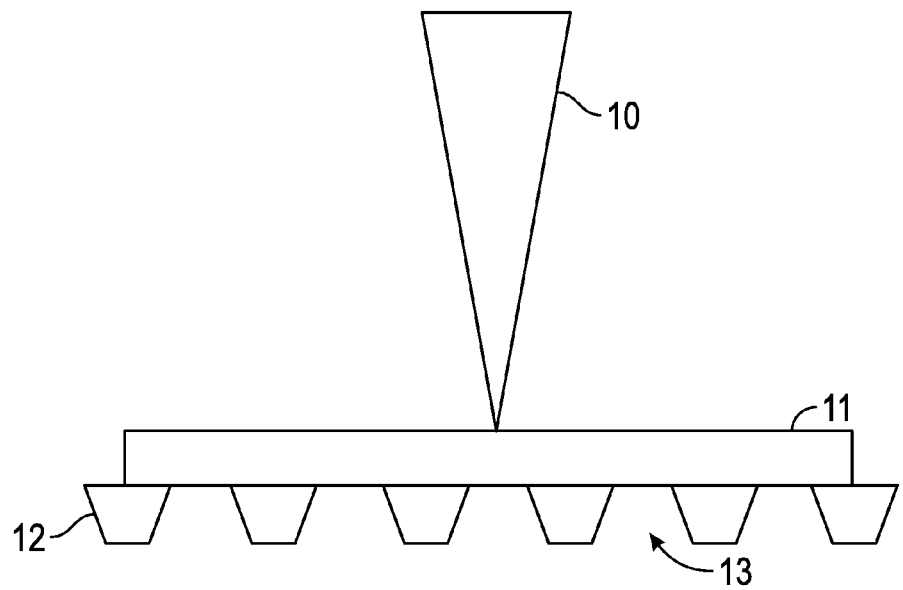
FIG. 1 shows a focused laser beam impinging on target material and metal belt with vacuum holes

Metal vacuum belts typically use a pattern of vacuum holes in the belt, through which a vacuum is applied from an external vacuum source to hold the target material onto the belt. The inventors realized metal belts have not been successfully used for laser processing because of the criticality of the vacuum hole diameter to clean and efficient laser processing of the target material. There are two possible failure modes in such a design. If the vacuum hole is too small, the hole will not have enough area to hold the target material down via an applied vacuum. When the target material is being processed by the laser, there is a vapor pressure created from the vaporization of the material. If there is not enough vacuum force holding down the target material, the material can be lifted by this vapor pressure. This can cause smoke and debris to get trapped under the target material and contaminate the material. Lifting of the material causes additional issues, including undesirable interference or defocus of the laser beam.

Conversely if the vacuum hole is too large, the hole will have too much area which can cause burning or contamination of the material in the diameter of the hole. Smoke and small particulates produced by laser processing can cause permanent damage to the bottom of the target material. A large vacuum hole also exposes the bottom of the target material to more oxygen that can increase burning of the material in the hole causing additional damage to the material.

The inventors also realized the criticality of the vacuum hole geometry. If the walls of the vacuum hole are angled in, when viewing from the laser processing side, the laser beam can be reflected back into the target material causing undesirable damage to the underside of the material. Alternatively if the walls of the vacuum hole are angled out, when viewing from the laser processing side, the laser beam will be reflected away from the bottom of the target material.

In summary, the size and geometry of the vacuum hole impacts how target materials are held to the surface of the belt as well as the magnitude of unwanted reflections or burn marks on the target material.

Extensive testing and analysis by the inventors was used to define characteristics of and create a vacuum hole shape and size to minimize the effects described above.

What was found is that holes larger than 0.635 mm (0.025") tended to cause burning of the bottom of the target material that was located within the diameter of the hole. Holes greater than 0.635 mm (0.025") in diameter would occasionally cause burning due to back reflection of the laser energy onto the bottom of the target material being processed. The inventors found that holes smaller than 0.127 mm (0.005") tended to cause a significant amount of back reflection and also did not hold the target material to the vacuum belt very well. In order to eliminate back reflection of the laser energy a reverse bevel of 40-60 degrees was used. These results are specific to $CO_2$ laser sources, but similar kinds of hole to wavelength ratios for other laser sources can be used.

Another effect studied by the inventors is when cutting target materials with a laser source, vaporization pressure is created as the target material is removed or vaporized by the energy of the laser. Cutting out small parts from the target material can cause these parts to be randomly ejected upwards from the surface of target material due to vaporization pressures. These small parts may fall on other areas of the target material and prevent the laser from correctly processing those covered areas. Extensive testing and analysis was completed by the inventors to determine optimal vacuum hole size and location to minimize ejection of small parts. Testing was completed using a CO2 laser source having a wavelength of 10.6 microns and 400 W maximum laser power, a laser beam focused to a diameter of 300 microns (0.012") on a target material of 200 micron (0.008") thick paper or plastic sheets, a laser processing area of 350 mm by 350 mm (13.8" by 13.8"), a metal vacuum belt measuring 550 mm (21.7") wide and approximately 4000 mm (157") in circumference, a transport conveyor with servo motor to accurately move the metal vacuum belt and therefore the target material, and a vacuum blower fan to supply a vacuum source through the transport conveyor to the underside of the metal vacuum belt. The sheets of target material was automatically fed and removed from the metal vacuum belt using well know means for feeding or stacking or the sheets were manually placed on the metal vacuum belt.

Embodiments describe a metal vacuum belt optimized for laser materials processing by achieving one or more of these specifications:

The belt material is capable of withstanding focused high power laser energy (>100 W).

The belt is configured to hold target material at a constant focal plane of the laser beam.

Vacuum hole geometry has reverse bevel inner walls of 40-60 degrees to minimize burning and back reflection onto the target material.

Vacuum hole diameter is small enough (<0.635 mm or 0.025") to minimize burning and back reflection of the target material.

Vacuum hole diameter is large enough (>0.127 mm or 0.005") to hold the target material and small parts to the belt while laser processing.

Vacuum hole spacing and location is optimized to prevent small part ejection while minimizing the possibility of vacuum hole intersection with the laser beam. Hole spacing is based upon the average smallest part diameter to retain on the belt and prevent the part from ejecting from the belt and potentially interfering with the laser beam. The hole spacing is typically less than the average diameter of the smallest parts that are required to be retained on the belt. Hole spacing is usually less than 10 mm (0.39") but greater than 5 mm (0.20").

Vacuum holes are to be placed into a belt and negative pressure is applied to the back surface of the belt. Target material placed on the belt is drawn close to the top surface of the belt because of the pressure difference. This keeps the target material flat and controls the movement of the target material to accurately process the target material with a focused laser beam while the belt is moving. The vacuum hole geometry and location require precise configuration to ensure damage and discoloration is not caused to the target material as well as small part ejection.

FIG. 1 illustrates an embodiment, showing the laser beam, with a focus 10, impinging on the belt 12 that holds the target material 11. The belt 12 includes a number of different vacuum holes 13. The holes 13 have a beveled side wall design in one embodiment. The belt 12 is oriented to allow the bevel to diverge from the belt surface making contact with the bottom surface of the target material being processed. Because of the beveled design, back reflection onto the material is avoided. Any reflection of the beam energy will be directed away from the material.

The specified vacuum holes can be produced with desired geometry, size, and location using a chemical etch, laser cutting, or other processes. The vacuum holes have a required diameter and side wall configuration to optimize laser processing as described earlier. The metal vacuum belt is now ready for installation in a conveyor designed to accurately transport the target material through the laser processing area.

FIG. 1 shows the target material 11 held flat and at a constant focal plane on the top surface of the belt 12 during laser processing. The focused laser beam 10 will not reflect energy off of the side walls of the vacuum holes and incident energy on the belt will reduce laser bending of the belt material and damage to the target material.

The shape and size of vacuum holes 13 in the belt 12 results in diverging side wall geometry with smooth surfaces and holes less than the diameter causing undesirable burn marks on the target material.

Figure 2:
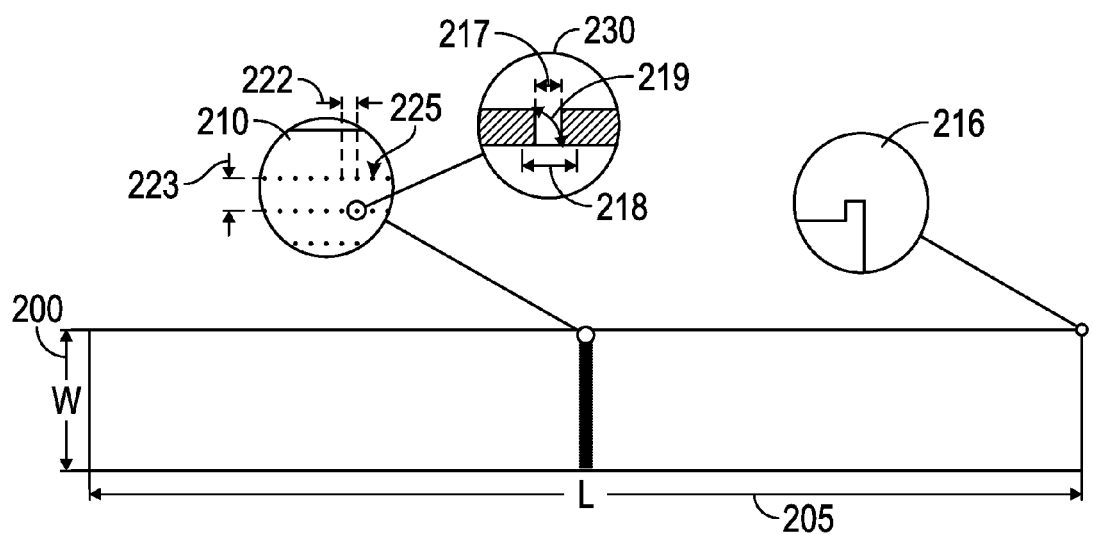
FIG. 2 shows a vacuum hole design on a metal belt

FIG. 2 is a drawing of a belt intended for laser processing applications. The drawing highlights dimensions of the belt including a vacuum hole pattern that defines the vacuum hole geometry, size, quantity, and location.

The belt has a width 200, and a length or circumference 205. These are both set according to the transport conveyor specification required in the final laser processing system. The entirety of the belt is formed with a pattern of vacuum holes of the type described above. Detail 210 shows the pattern of vacuum holes over the entirety of the belt. The holes can be spaced from one another by a distance in the conveyor transport or X-direction 222 and in the cross-conveyor or Y-direction 223. The vacuum holes are shown as 225. The vacuum holes formed in the belt are shown in detail 230 as having a top diameter 217 (in contact with the bottom surface of the target material) and a bottom diameter 218. An angle 219 defines the angle of the sidewall of the hole and in turn the shape of the hole. As described above, the angle is preferably between 40 and 60 degrees. Based on the predetermined laser source and focused laser beam size, dimensions shown in detail 230 are specified to ensure that laser beam back reflection and unwanted burning of the target material is minimized. The diameter of the hole 217 and the hole spacing 222, 223 are defined to minimize the probability of the focused laser beam and vacuum hole intersecting, ensure proper holding force of a target material, and minimizing ejection of small parts formed in the target material.

The tabs 216 called out in FIG. 2 can be used for laser welding the ends of the metal belt by the previously described belt manufacturing process. The beginning and end of a laser weld will have undesirable properties that are different than remainder of the weld so these tabs 216 are removed after welding.

Figure 3:
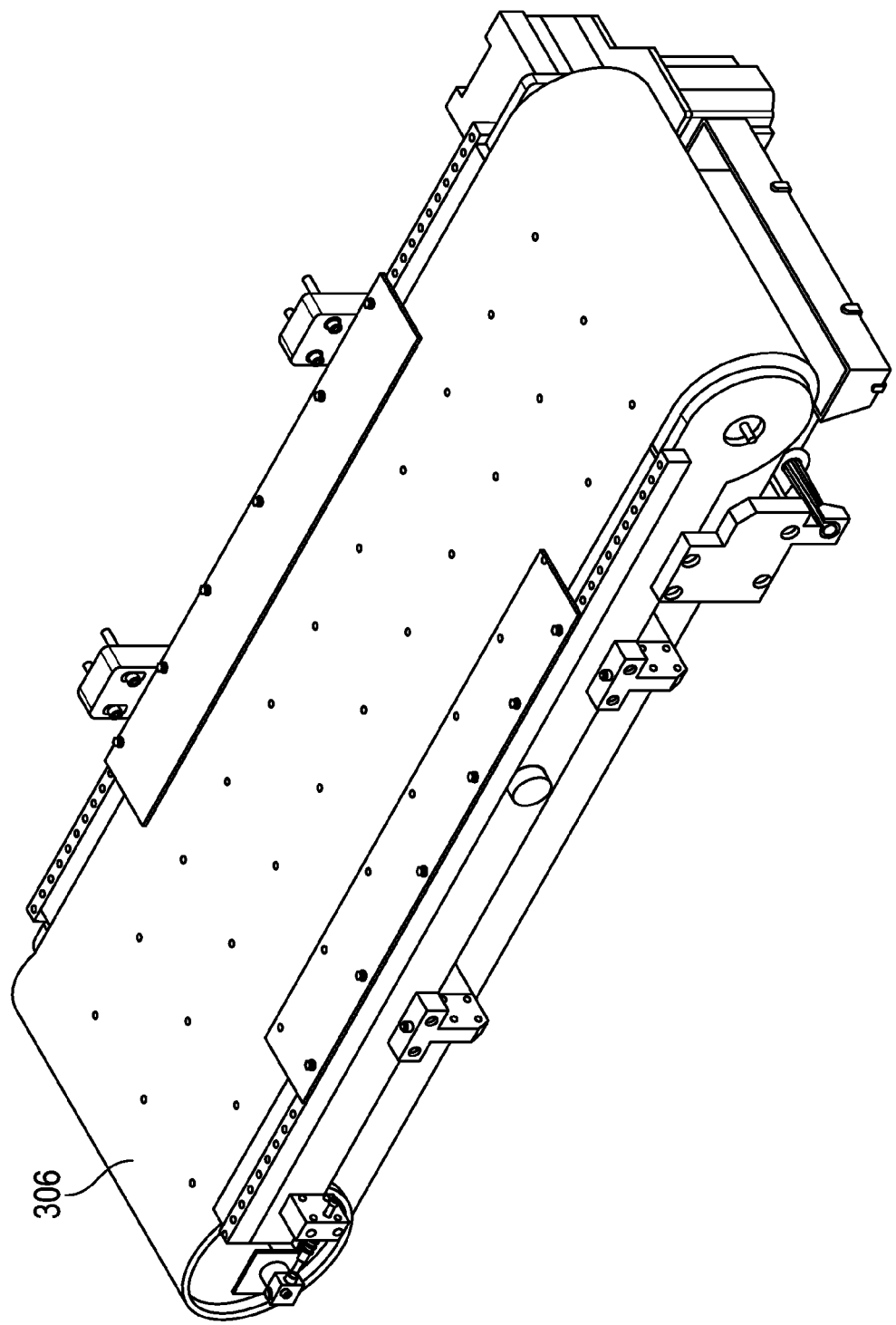
FIG. 3 shows the metal belt installed on a transport conveyor.

FIG. 3 shows a complete transport conveyor system with the metal vacuum belt 300 installed.

Figure 4:
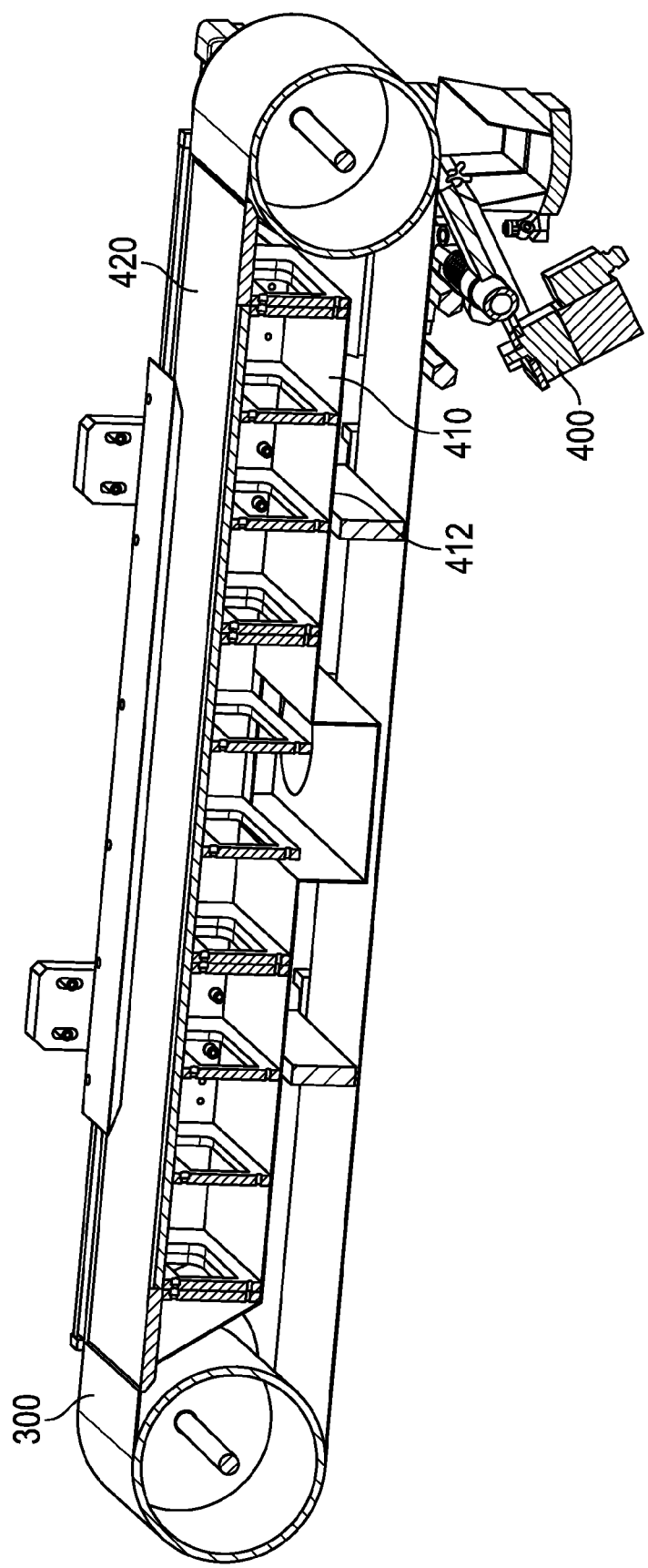
FIG. 4 shows a cross-section of a metal belt installed on a transport conveyor

FIG. 4 shows a cross-section of a transport conveyor system showing how vacuum is delivered to the underside of the metal vacuum belt 300 from an external vacuum source 400. The vacuum source 400 creates a vacuum in a number of vacuum chambers shown generally as 410 412. Each vacuum chamber is maintained under a specified level of vacuum by the vacuum pump 400. The vacuum is correspondingly formed through the holes 420 in the metal belt 300.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

For example, the inventors have created alternative embodiments, described herein is an alternative belt design, such as a belt with no holes. This belt design requires alternative methods to hold the target material to the belt. One such alternative method is to use electrostatic forces to hold the target material to the belt. Several difficulties can arise in using electrostatic forces including static generation prior to laser processing and static discharge after laser processing. Also, some belt materials may not be susceptible to holding a charge. The belt material in this embodiment must have an attractive surface charge to hold the target material but does not discharge into the target material. Accumulating electrostatic charge on these materials can also be dangerous to both operators and equipment. The inventors discovered that coatings or different materials may be applied to the belt to achieve the desired result. Another alternative method for holding the target material to the belt is to use a removable adhesive.

What is claimed is:

1. A transporting system, comprising:
   a metal belt, formed of a metal material, and having plural holes therein, said metal belt formed into a continuously moving conveyor, said conveyor having an outer surface and an inner surface;
   a vacuum source connected to apply vacuum to each of the plural holes through said inner surface;
   where the holes have a smaller hole size at the outer surface of the belt and a larger hole size at the inner surface of the belt, and the holes are beveled in cross-section between the inner surface of the belt and the outer surface of the belt relative to form the smaller hole size of the top and the larger hole size at the bottom to form the smaller hole size at the outer belt surface and the larger hole size at the inner belt surface, where said belt forms a processing area adjacent said outer surface of said belt.

2. The system as in claim 1, further comprising a laser system, with an output beam that is facing towards said processing area.

3. The system as in claim 2, wherein said metal belt and said vacuum source hold a work piece against said surface of said belt in an area of said processing area.

4. The system as in claim 2, wherein said laser is focused on an area of said processing area.

5. The system as in claim 1, wherein the holes are beveled in cross-section at an angle relative to the inner surface of the belt.

6. The system as in claim 5, wherein the angle is between 40 and 60°.

7. The system as in claim 1, wherein the hole size at the outer surface is between 0.005" in diameter and 0.025 inches in diameter.

8. The system as in claim 4, wherein a spacing between holes is based upon an average smallest part diameter to retain on the belt and prevent the workpiece from ejecting from the belt and potentially interfering with a beam of the laser.

9. The system as in claim 8, wherein the hole spacing is ≤10 mm but ≥5 mm.

10. A method of transporting a target workpiece, comprising:
    forming a conveyor using a metal belt, formed of a metal material, and having plural holes therein, said metal belt formed into a continuously moving conveyor, said conveyor having an outer surface and an inner surface;
    applying vacuum to each of the plural holes through said inner surface;
    where the holes have a smaller hole size at a top surface of the belt and a larger hole size at a bottom surface of the belt, and the holes are beveled in cross-section between the inner surface of the belt and the outer surface of the belt relative to form the smaller hole size at the outer belt surface and the larger hole size at the inner belt surface; and
    processing the workpiece on the belt in a processing area adjacent said outer surface of said belt.

11. The method as in claim 10, wherein said processing uses a laser, with an output beam that is facing towards said processing area and wherein said laser is focused on an area of said processing area.

12. The method as in claim 11, wherein said metal belt and said vacuum source hold the workpiece against said surface of said belt in said processing area.

13. The method as in claim 10, wherein the holes are beveled in cross-section at an angle relative to the inner surface of the belt.

14. The method as in claim 13, wherein the angle is between 40 and 60°.

15. The method as in claim 10, wherein the hole size at the outer surface is between 0.005" in diameter and 0.025 inches in diameter.

16. The method as in claim 10, wherein a spacing between holes ≤10 mm but ≥5 mm.

17. A transporting system, comprising:
    a metal belt, formed of a metal material, and having plural holes therein that are between 0.005" in diameter and 0.025 inches in diameter, said metal belt formed into a continuously moving conveyor, said conveyor having an outer surface and an inner surface;
    a vacuum source connected to apply vacuum to each of the plural holes through said inner surface;
    where the holes are beveled in cross-section at an angle between 40 degrees and 60 degrees relative to said inner surface of the belt to form a smaller hole size at the outer surface and a larger hole size at the inner surface;
    and wherein the holes are spaced ≤10 mm but ≥5 mm from one another,
    a laser system, with an output beam that is emitted towards a laser processing area in an area of the belt on said outer surface,
    wherein said metal belt and said vacuum source hold a work piece against said surface of said belt in an area of said laser processing area, and said laser is focused on an area of said laser processing area.

* * * * *